J. Rutter.
Refrigerator.
N°66,666. Patented Jul. 9, 1867.
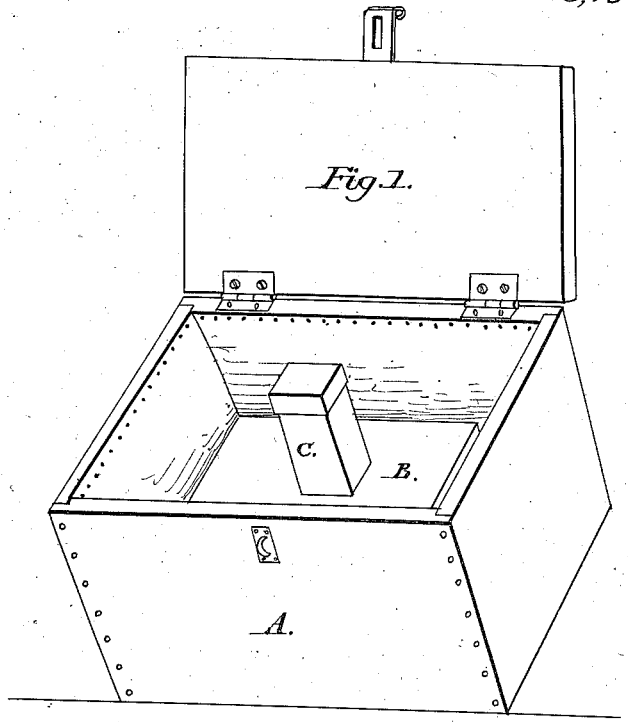
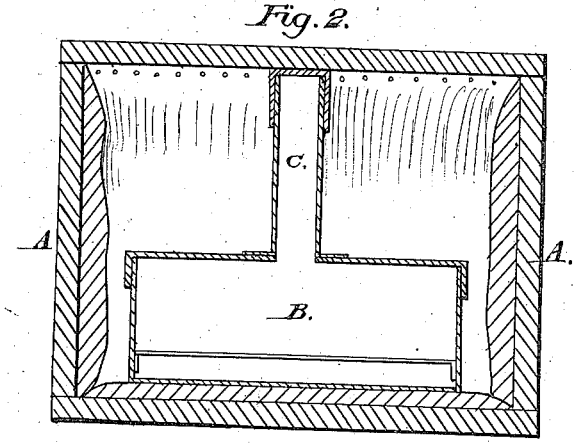

UNITED STATES PATENT OFFICE.

JOHN RUTTER, OF WEST CHESTER, PENNSYLVANIA.

IMPROVEMENT IN PRESERVING, STORING, AND TRANSPORTING FRUITS, VEGETABLES, AND OTHER PERISHABLE ARTICLES.

Specification forming part of Letters Patent No. 66,666, dated July 9, 1867.

*To all whom it may concern:*

Be it known that I, JOHN RUTTER, of the borough of West Chester, in the county of Chester and State of Pennsylvania, have made a new and useful Improvement in Preserving, Storing, and Transporting Fruits, Vegetables, and other perishable articles; and I hereby declare the following to be a full and exact description of the same, reference being had to the annexed drawings, forming a part of these specifications, in which—

Figure 1 is a perspective view of my invention applied to a box, crate, barrel, car, or any other known form or mode for conveyance of fruits, vegetables, and other perishable articles to market. Fig. 2 is a vertical section of the same.

To enable others skilled in the art to make and use my invention, I will proceed to describe its construction and operation.

I construct a box, crate, barrel, car, or any other known form or mode for conveyance, which said box or vessel may or may not be lined, but if lined it may be done by boards, metal, or canvas, or other material, leaving a suitable space between the lining and outer box or vessel, marked A, in Fig. 1, to be filled with any well-known non-conducting substances. In the box or vessel A, in Fig. 1, I place on the bottom, or in any other part of the interior thereof, a tin, copper, or other metallic case or box, or their equivalents, and of any size or form suitable for the reception of ice, or any other substance in combination therewith, in their proper proportions, to reduce the temperature of the interior of said box A.

There are a large number of articles, such as fruits, vegetables, and the like, which soon perish unless they are kept at a temperature not much above 50° Fahrenheit. Such articles are usually stored in cellars, ice-houses, refrigerators, preserving-houses, and other similar structures, and, while efficient for preserving perishable articles while in store, will not answer well for transportation, especially for transportation in the ordinary modes of sending fruits, vegetables, and other perishable articles to market.

The object of my invention is to provide a cheap, simple, and efficient mode of sending to market, without danger of loss in warm or hot weather, any or all perishable articles, the products of farms, &c.

To this end I construct the tin, copper, or other metallic case or box B, Figs. 1 and 2, filled as aforesaid, and to be placed in any part of the interior of box A. From the surface of this box B, I carry up a tube or cylinder, C, of any suitable size or form, extending quite up to the lid of box A, if desired, which tube may be also filled with ice. Unless in very warm weather, this cylinder may be dispensed with, or may be increased to any desired number.

The metallic box B, Fig. 2, is divided in the interior by slats or bars of suitable size, and distant from each other above the bottom, leaving a space for the water to accumulate, to be drawn off by the ordinary means.

By inclosing the ice or other substances in combination therewith, as salt, &c., in a metallic vessel, or one in which the walls are poor conductors of heat, and placing this inside the box, case, barrel, or other vessel in which the articles to be transported are placed, and then closing up the whole in the ordinary manner, the temperature will be kept a sufficient time for transportation to market below that at which articles decay and perish; also, since the ice is inclosed in its own tight vessel, the water resulting from the gradual melting of the ice will not be mixed with the articles preserved and transported.

When circumstances require a very low temperature to be kept up, salt, or its equivalent, may be mixed with the ice in definite proportions.

What I claim, is—

The herein-described process of preserving and transporting perishable articles, said process consisting in placing inside the box, crate, barrel, or car, or other closed vessel in which the articles are placed for preservation and transportation, a water-tight metallic vessel, or its equivalent, filled or partially filled with ice, or ice and salt, or their equivalent, substantially as described.

J. RUTTER.

Witnesses:
J. R. HAYES,
ALEXR. A. C. KLAUCKE.